(12) United States Patent
Takaoka (10) Patent No.: US 6,633,650 B1
(45) Date of Patent: *Oct. 14, 2003

(54) IMAGE PROCESSING APPARATUS (75) Inventor: Naoki Takaoka, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,464

(22) Filed: Mar. 25, 1999

(30) Foreign Application Priority Data

Mar. 25, 1998 (JP) .............................. 10-077046

(51) Int. Cl.[7] .............................................. G03B 27/52
(52) U.S. Cl. ............................... 382/100; 396/1; 355/40
(58) Field of Search ................................. 382/100, 268, 382/274, 260, 264, 298; 396/237, 564, 1, 30, 527, 42, 90, 98; 362/3; 399/237; 355/40

(56) References Cited

U.S. PATENT DOCUMENTS

| | | | | |
|---|---|---|---|---|
| 4,210,392 A | * | 7/1980 | Fauth | 396/207 |
| 4,991,092 A | * | 2/1991 | Greensite | 364/413 |
| 5,337,164 A | * | 8/1994 | Yabe et al. | 358/487 |
| 5,871,888 A | * | 2/1999 | Heremans et al. | 430/321 |
| 5,905,817 A | | 5/1999 | Matama | |
| 5,917,578 A | | 6/1999 | Nakamura | |
| 5,974,190 A | * | 10/1999 | Maeda et al. | 382/255 |
| 6,047,132 A | * | 4/2000 | Maeda | 396/53 |
| 6,219,129 B1 | * | 4/2001 | Kinjo et al. | 355/40 |
| 6,323,934 B1 | * | 11/2001 | Enomoto | 355/40 |
| 6,501,530 B2 | * | 12/2002 | Kurtz et al. | 352/41 |

FOREIGN PATENT DOCUMENTS

| | | |
|---|---|---|
| JP | 5-158134 A | 6/1993 |
| JP | 09-182093 A | 7/1997 |
| JP | 09-281613 A | 10/1997 |

OTHER PUBLICATIONS

Naoki Asada et al, 1996, IEEE, pp. 186–190.*
Japanese Office Action/Notification of Reasons for Refusal; Dispatch No.: 049383; Dispatch Date: Feb. 18, 2003.

* cited by examiner

Primary Examiner—Bhavesh M. Mehta
Assistant Examiner—Barry Choobin
(74) Attorney, Agent, or Firm—Birch, Stewart, Kolasch & Birch, LLP (57) ABSTRACT The image processing apparatus executes predetermined image processing on image data obtained by photoelectrically reading an image photographed on a photographic film through a photographic lens of a camera, and thus obtains the image data for output. The apparatus comprises a unit for obtaining a characteristic of the photographic lens, a unit for developing the characteristic of the photographic lens into a dipping quantity corresponding to a position of the image, and a unit for compensating a marginal light quantity of the image by use of the dipping quantity. The apparatus is capable of compensating a decrease in light quantity of an area peripheral to the image even when the image is photographed through a low-performance lens, and obtaining a high quality image with stability without any darkened peripheral area.

16 Claims, 7 Drawing Sheets

IMAGE PROCESSING APPARATUS

BACKGROUND OF THE INVENTION

The present invention relates generally to an image processing apparatus for obtaining image data by photoelectrically reading an image on a film, executing predetermined image processing upon the obtained image data, and thus obtaining the image data for output, and more particularly to an image processing apparatus based on a technology of compensating a drop (decrease) in light quantity in the periphery of the image which occurs with respect to the image photographed on a one time use camera, etc.

A prevailing method of printing on a photosensitive material (photographic printing paper) an image photographed on a photographic film such as a negative film and a reversal film (which are hereinafter generically referred to as a film), has hitherto been a so-called direct exposure (analog exposure) of exposing a surface of the photosensitive material to the light by projecting the film image upon the photosensitive material.

By contrast, there has been in recent years utilized a printing apparatus that makes use of a digital exposure, i.e., a digital photo printer for obtaining a (finished) print by photoelectrically reading an image recorded on the film, converting the read image into digital signals, thereafter executing a variety of image processing on the digital signals to thereby acquire image data for record, and recording the image (latent image) by scan-exposing the photosensitive material to a recording light beam modulated corresponding to the above image data.

The digital photo printer is capable of converting the image into digital image data and determining an exposure condition when in printing through the image data processing, and is therefore able to obtain a high quality print, which could not be acquired so far by the prior art direct exposure method, by preferably compensating a discontinuous density and an over-density (such as a washed-out highlight and a dull shadow) of the image which might be attributed to back light and electronic flash photography, etc., executing a sharpness (sharpening) process, and compensating a failure in terms of color or density. The digital photo print is also capable of synthesizing a plurality of images or dividing the image as well as synthesizing characters by the image data processing, and outputting a print which is edited and processed flexibly corresponding to applications.

Besides, the digital photo printer is capable of supplying the image data to a comouter, etc. as well as outputting the image by way of a print and storing a recording medium such as a floppy disk, etc. with the image data, and the stored data can be therefore utilized for a variety of applications other than the photography.

This type of digital photo printer is constructed basically of an image input apparatus including a scanner (image reading apparatus) for photoelectrically reading the image recorded on the film and an image processing apparatus for executing image processing on the read image to obtain image data (exposure condition) for output, and an image output apparatus including a printer (image recording apparatus) for recording a latent image by scan-exposing the photosensitive material to the light in accordance with the image data outputted from the image input apparatus, a processor (developing apparatus) for obtaining a print by executing a developing process on the exposed photosensitive material.

In the scanner, reading light beam emitted from a light source is incident on the film, projection light bearing an image photographed on the film is thus obtained and projected to form the image at an image sensor such as CCD sensors through an image-forming lens, the image is read by performing a photoelectric conversion, and the image is subjected to various processes according to the necessity and is thereafter transmitted as image data (image data signals) of the film to the image processing apparatus.

The image processing apparatus sets an image processing condition based on the image data read by the scanner, executes the image processing corresponding to the set condition upon the image data, and sends the data as output image data (exposure condition) for recording the image to the printer.

The printer, if classified as an apparatus utilizing, e.g., a light beam scan exposure, modulates the light beam corresponding to the image data transmitted from the image processing apparatus, deflects the light beam in a main scan direction, then carries the photosensitive material in a auxiliary scan direction orthogonal to the main scan direction, forms a latent image by exposing (printing) the photosensitive material to the light beam carrying the image, and subsequently executes a developing process corresponding to the photosensitive material in the processor, thereby obtaining the print (photo) containing the reproduced image photographed on the film.

It is preferable for obtaining the high quality print that the possibly greatest number of images (image information) of photographed scenes be recorded on the film with fidelity.

In particular, however, a so-called one time use camera integrated with a lens and a film is unable to enhance a lens performance so much because of its being severely restricted in terms of cost, with the result that a marginal light quantity about the image center decreases. The one time use camera is also called a single use camera, lens with film or snap shooting unit. As a consequence, there arises a problem that the area peripheral to the image is darkened in the finished print.

SUMMARY OF THE INVENTION

Accordingly, it is a primary object of the present invention, which was devised to obviate the problems described above, to provide an image processing apparatus capable of compensating a decrease in light quantity of an area peripheral to the image even when the image is photographed through a low-performance lens, and obtaining a high quality image with stability without any darkened peripheral area.

To accomplish the above object, according to one aspect of the present invention, there is provided an image processing apparatus for executing predetermined image processing on image data obtained by photoelectrically reading an image photographed on a photographic film through a photographic lens of a camera, and thus obtaining the image data for output. The image processing apparatus comprises a unit for obtaining a characteristic of the photographic lens, a unit for developing the characteristic of the photographic lens into a dipping quantity corresponding to a position of the image, and a unit for compensating a marginal light quantity of the image by use of the dipping quantity.

In the thus constructed image processing apparatus, it is preferable that the marginal light quantity compensating unit changes an intensity of the marginal light quantity compensation corresponding to a film density of the image, decreases the compensation intensity in the vicinity of a minimum density on a film (e.g., a base density implying an unexposed area on a negative film, and a density defined as the fog area in a reversal film) or a maximum density in the film (e.g., a density defined as the fog area in a negative film, and a base density implying an unexposed area in a reversal film), and increases the compensation intensity as it gets farther away from the minimum density or the maximum density.

The image processing apparatus may further comprise a manes for obtaining information on the photographic film, and a means for converting the film density into a photographic light quantity and vice versa by use of a characteristic of the photographic film which is obtained from the information on the photographic film. It is preferable that the marginal light quantity be compensated in a range of the photographic light quantity.

It is also preferable the marginal light quantity compensating means executes, when in a pre-scan process of reading the image with a low resolution in advance of an image reading process for creating the output image data, the marginal light quantity compensation before an image analyzing process containing an auto setup process, or after making only an adjustment of a color balance in the image analyzing process.

It is further preferable that an image processing apparatus further comprises the means for obtaining information on said photographic lens, and a table previously created for showing a relationship between the information of the photographic lens and the characteristic of the photographic lens, wherein said photographic lens characteristic obtaining means reads a characteristic of said photographic lens corresponding to the obtained information of the photographic lens from the photographic lens information obtaining means and the table.

It is still further preferable that the marginal light quantity compensating means compensates a marginal light quantity of the image by use of a distance from a center of the image and the dipping quantity.

It is yet further preferable that the means for developing the photographic lens characteristic into the dipping quantity is a means for calculating a dipping quantity corresponding to the distance from the center of the image in accordance with the photographic lens characteristic.

In addition, it is preferable that the marginal light quantity compensating means does not compensate so much the marginal light quantity in the vicinity of the minimum density or the maximum density with respect to the image, intensively compensates the marginal light quantity in a density range existing away from the minimum density or the maximum density, and intermediately compensates the marginal light quantity in an intermediate density range therebetween.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE INVENTION

An image processing apparatus of the present invention will hereinafter be described in details by way of a preferred embodiment in conjunction with the accompanying drawings.

Figure 1:
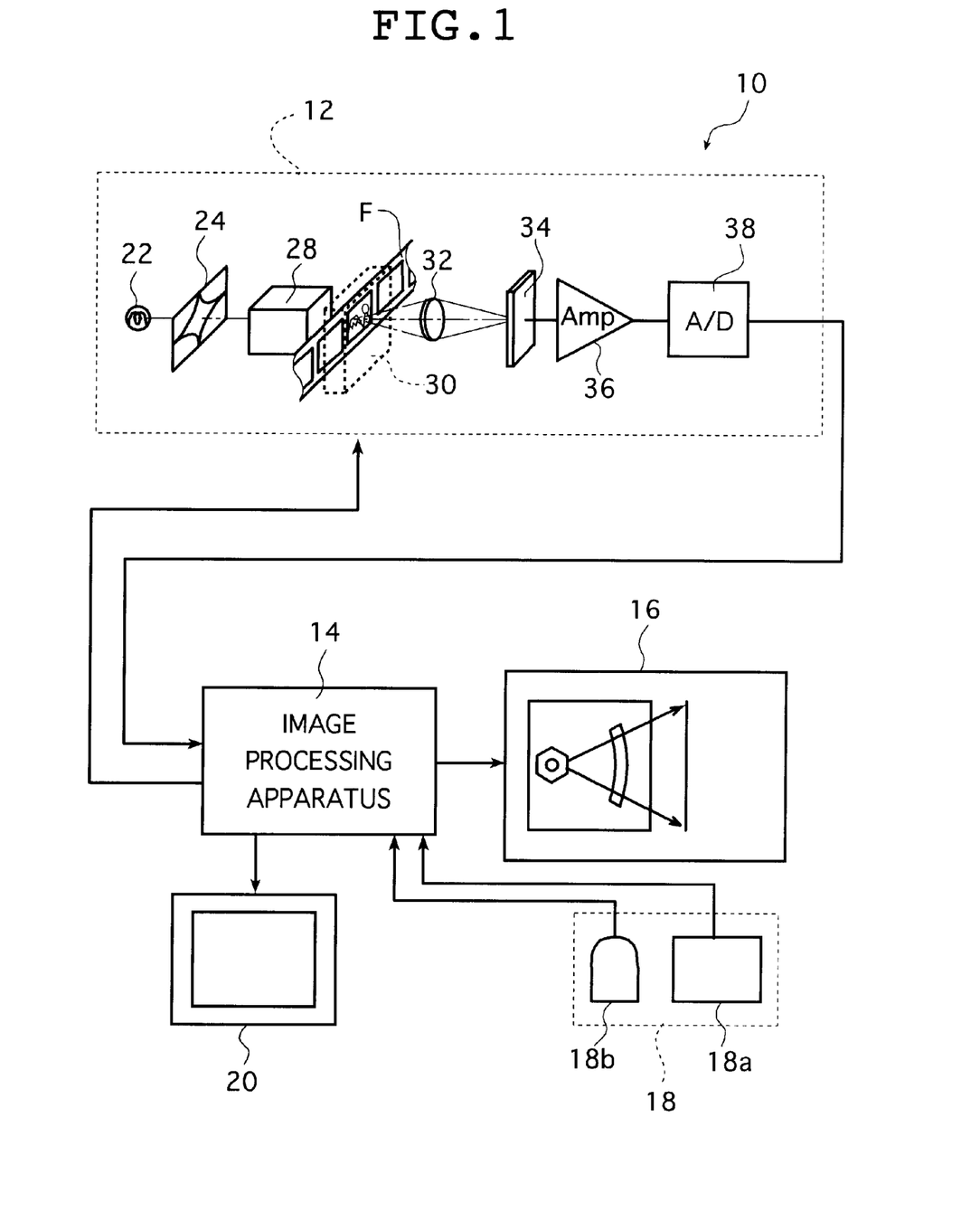
FIG. 1 is a block diagram showing one embodiment of a digital photo printer utilizing an image processing apparatus of the present invention.

FIG. 1 is a block diagram showing one embodiment of a digital photo printer including the image processing apparatus of the present invention.

A digital photo printer (hereinafter simply referred to as a photo printer) 10 shown in FIG. 1 basically includes a scanner (image reader) 12 for photoelectrically reading an image photographed on a film F, an image processing apparatus 14 for executing image processing upon the read image data (image information) and operating and controlling a photo printer 10 as a whole, and a printer 16 for image-exposing a photosensitive material (photographic printing paper) to a light beam modulated corresponding to the image data outputted from the image processing apparatus 14, then effecting a developing process thereon, and outputting the thus developed photosensitive material as a (finished) print. In the discussion which follows, a negative film will be typically exemplified as a film F. The present invention is not, however, limited to this film and may, as a matter of course, embrace the use of a positive film such as a reversal film, etc.

Connected also to the image processing apparatus 14 are an operation system 18 including a keyboard 18a and a mouse 18b through which to input (set) a variety of conditions, and input a selection or indication of a process and an indication such as compensating a color and a density, and a display unit 20 for displaying the image read by the scanner 12, operational indications in a variety of categories, and a condition setting/registering screen, etc.

The scanner 12 is a device for photoelectrically reading framewise the image photographed on the film F, etc. The scanner 12 includes a light source 22, a variable stop 24, a diffusion box 28 for uniformizing in a plane direction of the film F the reading light beams incident upon the film F, an image forming lens unit 32, an image sensor 34 having line CCD sensors respectively corresponding to processes of reading images of R (red), G (green) and B (blue), an amplifier 36, and an A/D (analog-to-digital) converter 38.

Furthermore, the photo printer 10 is provided with a dedicated carrier 30 attachable to a body of the scanner 12, corresponding to a classification and a size of a film such as an Advanced Photo System film and a 135-size negative (or reversal) film, etc., and a film type such as a strips type and a slide type. A variety of films and processes can be adopted to with a replacement of the carrier 30. The image (frames) photographed on the film and serving for creating a print is carried to a predetermined reading position by this carrier 30.

In the thus structured scanner 12, when the image photographed on the film F is read, the reading light beam emitted from the light source 22, of which a light quantity is controlled by the variable stop 24, falls upon and penetrates the film F located in the predetermined reading position by the carrier 30, thereby obtaining a projection light beam bearing the image photographed on the film F.

Figure 2:
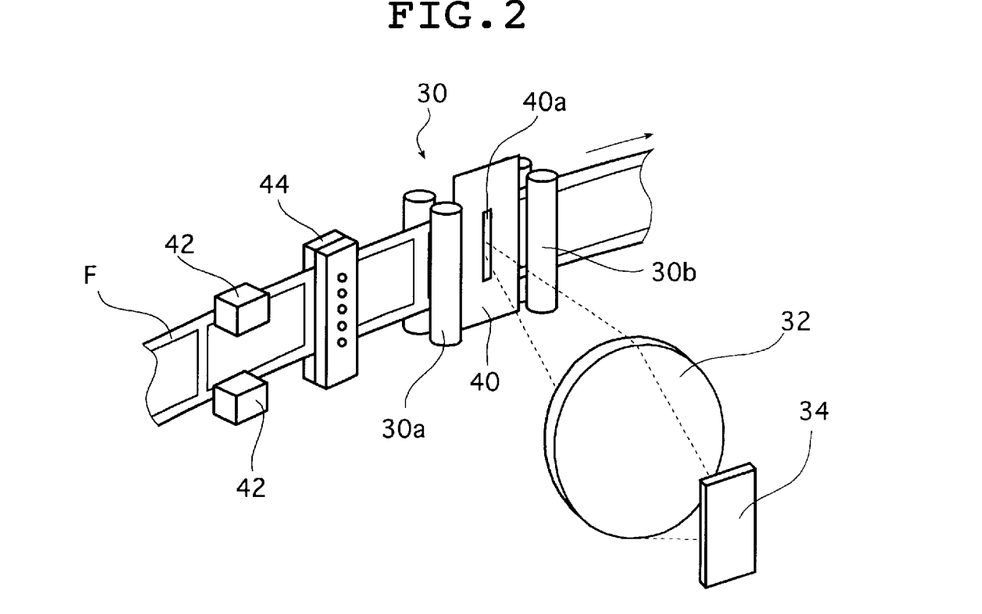
FIG. 2 is an schematically perspective view schematically showing one embodiment of a carrier fitted to the digital photo printer shown in FIG. 1.

The carrier 30 structured corresponding to the Advanced Photo System film F (cartridge) includes, as schematically shown in FIG. 2, a couple of carrier rollers 30a, 30b, disposed at the predetermined reading position set therebetween in an auxiliary scan direction (indicated by an arrow), for carrying the film F, while being located in the predetermined reading position, in the auxiliary scan direction orthogonal to an extending direction (main scan direction) of the line CCD sensors of the image sensor 34, with the longitudinal direction of the film F being coincident therewith. The carrier 30 also includes a mask 40 formed with a slit 40a, disposed corresponding to the reading position and extending in the main scan direction, for defining in a predetermined slit shape the projection light beam upon the film F.

The film F is located in the reading position by this carrier 30 and receives an incidence of the reading light beam while being carried in the auxiliary scan direction. With this operation, as a result, the film F is two-dimensionally slit-scanned through the slit 40a extending in the main scan direction, thereby reading each frame of the image photographed on the film F.

Herein, as known well, the Advanced Photo System film is formed with a magnetic recording medium on which various items of information are previously recorded, and to which a camera, a developing device and the carrier 30 write the various items of information, or from which the information is read as the necessity may arise.

Figure 3:
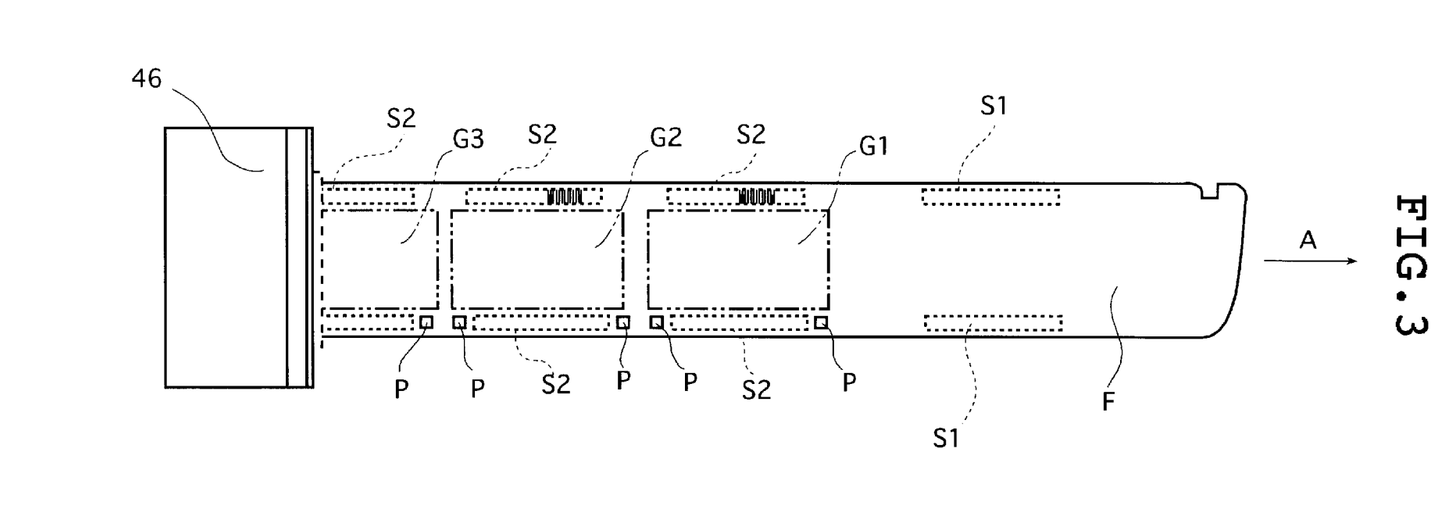
FIG. 3 is a schematic diagram illustrating an Advanced Photo System film.

More specifically, as conceptually shown in FIG. 3, the Advanced Photo System film F is formed with transparent magnetic recording mediums S (S1, S2) extending in the longitudinal direction (the auxiliary scan direction) and provided in the vicinities of two widthwise edges (in the main scan direction) of a predetermined region on a more leading edge than a head frame G1 in a draw-out direction (in an arrow direction A in FIG. 3) from the cartridge, regions corresponding to the respective frames G, and a predetermined region on a more trailing edge than an unillustrated rear end frame. Pieces of information on the whole film F such as a cartridge ID (Identification), a film type, a sensitivity, and a developed date, are magnetically recorded on the magnetic recording medium S1 formed at the leading (trailing) edge of the film F. Pieces of per-frame information such as a photographed time and date, a use or non-use of an electronic flash when photographed and a title, etc., are recorded on the magnetic recording medium S2 in each frame region. Furthermore, basically, camera-related information containing information on a photographic lens is recorded on one side of the magnetic recording medium S in the width direction thereof, and laboratory-related information is recorded on the other side thereof, respectively.

Note that the reference numeral 46 in FIG. 3 designates a cartridge body for storing the film F, and the symbol P represents perforations serving to carry (feed and rewind) the film F.

At the carrier 30 adopted to the Advanced Photo System film F, magnetic heads 42, 42 for reading the information recorded on the magnetic recording medium S and recording necessary pieces of information thereon are disposed correspondingly to the two magnetic recording mediums S.

Further, a code reader 44 for optically reading bar codes such as a DX code, an extension DX code, and FNS code, which are optically recorded on the film, are disposed between the magnetic heads 42 and a mask 40. Note that a device for reading the bar codes recorded on the film may be disposed at a normal (film) carrier without being limited to the Advanced Photo System carrier 30.

Various items of information read by the magnetic heads 42 and the code reader 44 (which correspond to a device for obtaining the information on the photographic lens and a device for obtaining the film information) are transmitted to predetermined units such as the image processing apparatus 14 according to the necessity.

As discussed above, the reading light beam travels through the film F held by the carrier 30 and turns out to be the projection light beam bearing the image. The projection light beam is projected on and thus forms an image on a light receiving surface of the image sensor 34 through the image forming lens unit 32.

Figure 4:
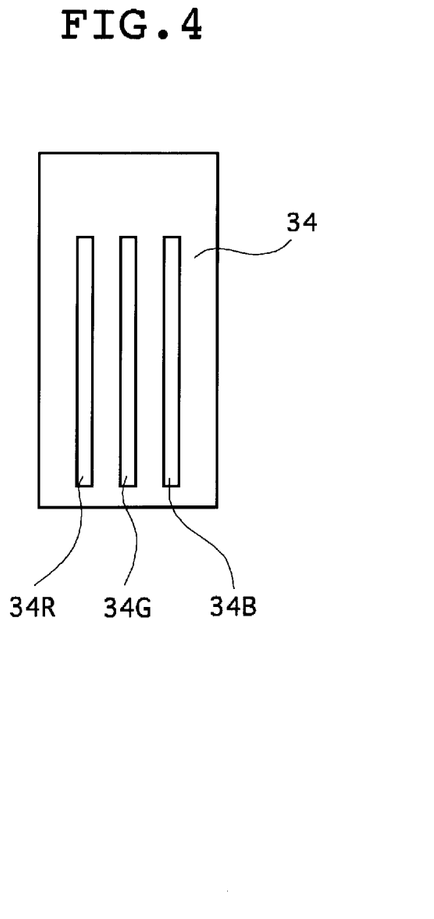
FIG. 4 is a schematic diagram showing one embodiment of an image sensor of the digital photo printer shown in FIG. 1.

As shown in FIG. 4, the image sensor 34 is classified as a so-called 3-line color CCD sensor including a line CCD sensor 34R for reading an R-image, a line CCD sensor 34G for reading a G-image, and a line CCD sensor 34B for reading a B-image. Each line CCD sensor, as explained above, extends in the main scan direction. The projection light beam on the film F is separated into three primary colors R, G and B and optically read by this image sensor 34.

Output signals of the image sensor 34 are amplified by the amplifier 36, then converted into digital signals by the A/D converter 38, and transmitted to the image processing apparatus 14.

The scanner 12 executes two image reading processes, i.e., a pre-scan for reading the image photographed on the film F with a low resolution, and a main scan for obtaining image data of an output image.

The pre-scan is conducted under a pre-scan reading condition preset so that the image sensor 34 is capable of reading without saturation all the images on the entire film, at which the scanner 12 targets. On the other hand, the main scan is performed under a main scan reading condition set per frame so that the image sensor 34 is saturated at a density slightly lower than a minimum density of the image (frame) from the pre-scan data.

The output signals of the pre-scan and the main scan are fundamentally the same with an exception that the resolutions and output levels are different from each other.

It is to be noted that the scanner 12 constituting an image input device according to the present invention is not confined to what is based on the slit scan described above, and may be what depends on a surface exposure for reading the entire surface of the one-frame image at one time.

This case may involve the use of, e.g., an area CCD sensor and an R- G- and B-color filters inserting device provided between the light source and the film F. The images are sequentially read by the area CCD sensor with an insertion of each of the R-, G- and B-color filters, thus reading the images photographed on the film F by separating each image into the three primary colors.

As explained above, the digital signals outputted from the scanner 12 are outputted to the image processing apparatus 14 (hereinafter simply referred to as the processing apparatus 14).

Figure 5:
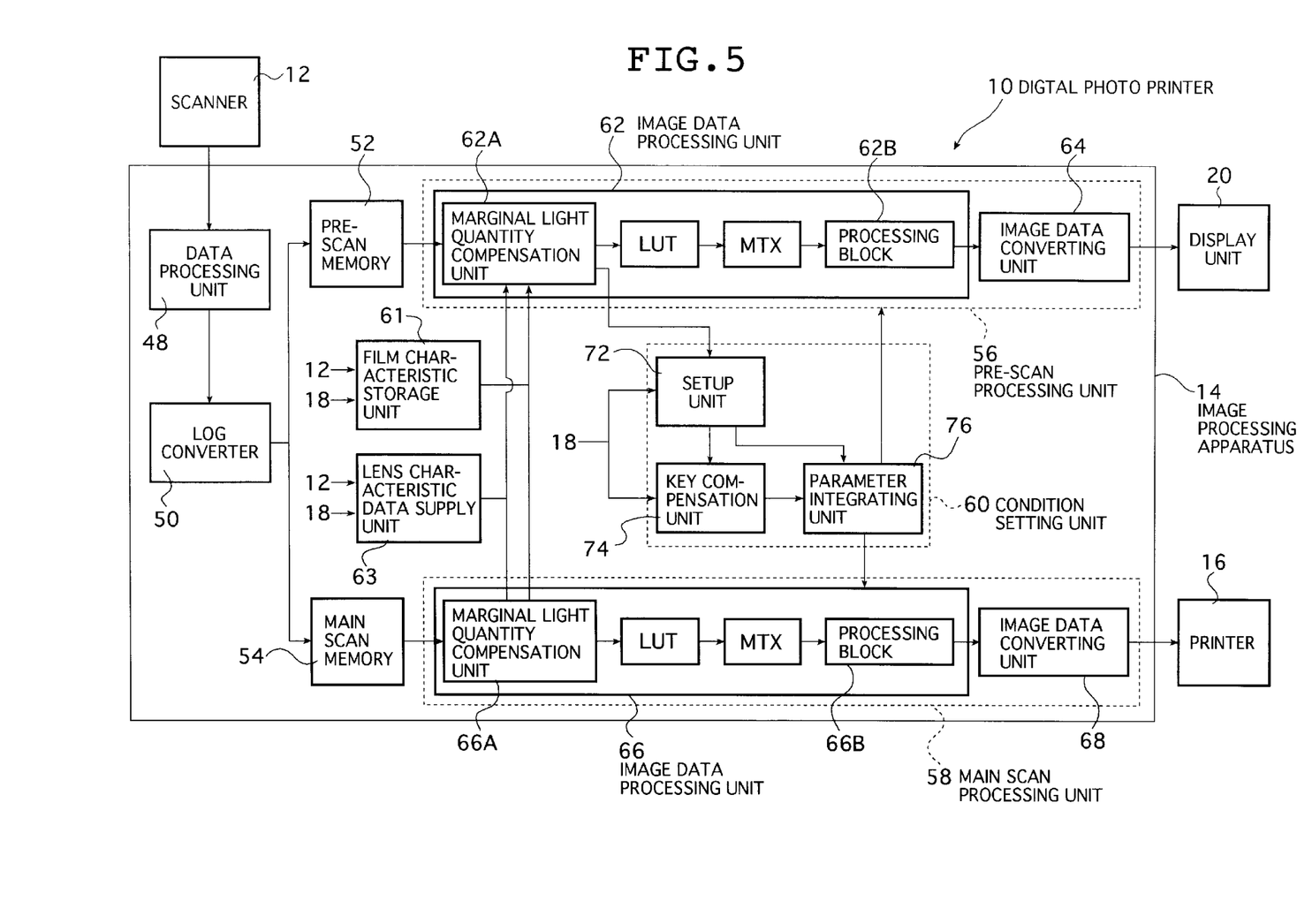
FIG. 5 is a block diagram showing one embodiment of the image processing apparatus of the digital photo printer shown in FIG. 1.

FIG. 5 is a block diagram showing the processing apparatus 14. The processing apparatus 14 has a data processing unit 48, a Log converter 50, a pre-scan (frame) memory 52, a main scan (frame) memory 54, a pre-scan processing unit 56, a main scan processing unit 58, a condition setting unit 60, a film characteristic storage unit 61, and a lens characteristic data supply unit 63.

Note that FIG. 5 shows principally the components pertaining to the image processing, and, in addition to those shown in FIG. 5, the processing apparatus is provided with a CPU controlling and managing the whole photo printer 10 including the processing apparatus 14, and with a memory for storing information needed for the operation of the photo printer 10. Further, the operation system 18 and the display unit 20 are connected via the CPU (CPU bus) and the like to those components.

The R-, G- and B-color digital signals outputted from the scanner 12 are subjected to predetermined data processing such as a dark-time compensation, a defective pixel correction and a shading compensation in the data processing unit 48, and thereafter converted into the digital image data (density data) by the Log converter 50. The pre-scan data is stored (saved) in the pre-scan memory 52, while the main scan data is stored in the main scan memory 54.

The pre-scan data stored in the pre-scan memory 52 is read by a pre-scan processing unit 56 including an image data processing unit 62 (hereinafter simply termed the processing unit 62) and an image data converting unit 64. On the other hand, the main scan data stored in the main scan memory 54 is read by a man scan processing unit 58 having an image data processing unit 66 (hereinafter simply termed the processing unit 66) and an image data converting unit 68.

The processing unit 62 of the pre-scan processing unit 56 and the processing unit 66 of the main scan processing unit 58, are components for executing predetermined image processing and compensations corresponding to characteristics of the lens by which and the film on which the image is photographed with respect to the image (image data) read by the scanner 12 in accordance with a processing condition set by a condition setting unit 60 which will be explained later on.

The image processing by the processing units 62, 66 might be exemplified by a color balance adjustment, a contrast compensation (gradation processing), a brightness compensation, a dodging process (compression/extension of a density dynamic range), a saturation compensation, a sharpness (sharpening) process, etc. These processes are executed by a known method, wherein a calculation, a process through a LUT (look-up table), a matrix (MTX) calculation and a process through a filter are properly combined. In the illustrative example, the color balance adjustment, the brightness compensation and the contrast compensation are carried out by use of the LUT, and the saturation compensation is implemented through the MTX calculation. Further, the sharpness process and the dodging (shading) process other than these processes are executed in a block 62B and a block 66B in accordance with an indication from an operator and the image data as well.

Herein, a pre-scan process oriented marginal light quantity compensating unit 62A and a main scan process oriented marginal light quantity compensating unit 66A are respectively disposed in front of the LUTs of the processing units 62, 66.

In the processing apparatus 14 of the present invention, as the necessity may arise, each of the marginal light quantity compensating units 62A, 66A compensates a decrease in light quantity in the periphery of the image photographed on the film F by the image processing, which involves the use of the lens characteristic and positional information on the image, thereby attaining a stable output of the print in which a high quality image is reproduced without darkening even in the periphery of the image.

The image data converting unit 68 converts the image data processed by the processing unit 66 into image data corresponding to an image record by the printer 16 by use of, e.g., a 3D (three-dimension)-LUT, etc., and supplies the printer 16 with the converted image data.

The image data converting unit 64 thins out the image data processed by the processing unit 62 according to the necessity, then converts the thinned-out image data into image data corresponding to a display on the display unit 20 similarly by use of the 3D-LUT and the like, and makes the converted image data displayed on the display unit 20.

Processing conditions in the two units are set by the condition setting unit which will be mentioned later on.

Th condition setting unit 60 sets the processing conditions in a variety of categories in the pre-scan processing unit 56 as well as in the main scan processing unit 58.

This condition setting unit 60 includes a setup unit 72, a key compensation unit 74 and a parameter integrating unit 76.

The setup unit 72 sets a main scan reading condition using the pre-scan data, etc. and supplies the scanner 12 with this reading condition. The setup unit 72 also creates (calculates) image processing conditions of the pre-scan processing unit 56 and the main scan processing unit 58, and supplies these conditions to the parameter integrating unit 76.

To be specific, the setup unit 72 reads the pre-scan data out of the pre-scan memory 52, and creates a density histogram and calculates a quantity of image characteristics such as an average density, a highlight (lowest density or minimum density), and a shadow (highest density or maximum density) from the pre-scan data, thereby determining a main scan reading condition. Further, the setup unit 72 sets the image processing conditions such as the color balance adjustment and the gradation adjustment in the above-described processing unit 66 (62) in accordance with an indication of the operator, which is given according to the necessity.

The key compensation unit 74 calculates an adjustment quantity (e.g., a LUT compensation quantity, etc.) of the image processing condition in accordance with a variety of indications inputted through the key and the mouse 18b for adjusting the density (brightness), the color, the contrast, the sharpness and the saturation which are set on the keyboard 18a, and supplies the calculated adjustment quantity to the parameter integrating unit 76.

The parameter integrating unit 76 receives the LUT compensation quantity calculated by the key compensation unit 74 and also the image processing condition set by the setup unit 72, and sets these items in the processing unit 62 of the pre-scan processing unit 56 and in the processing unit 66 of the main scan processing unit 58. Further, the parameter integrating unit 76 compensates (adjusts) the image processing condition set in each unit in accordance with the adjustment quantity calculated by the key compensation unit 74, or resets the image processing condition.

The above-mentioned film characteristic storage unit 61 stores film characteristics of various types of films.

Figure 6:
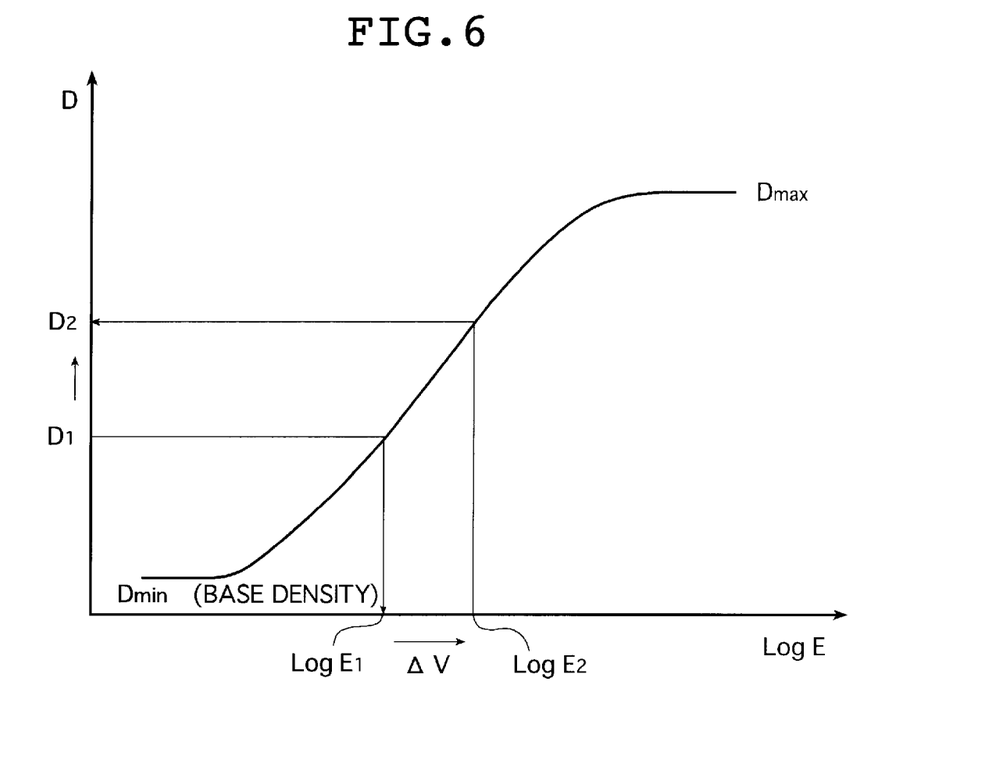
FIG. 6 is a graphic chart illustrating one example of a film characteristic curve and a method of performing a marginal light quantity compensation by use of this curve.

For instance, the film characteristic (gradation characteristic) is expressed by a relationship between a logarithm (Log E) of an exposure quantity E and a density (D) as shown in FIG. 6. Incidentally, what is exemplified in FIG. 6 is a negative film, and only one characteristic curve is shown. If the film F is classified as a color film, however, there must be three characteristic curves corresponding to R, G and B. These characteristic curves might, in the negative film also, differ depending on the types of films, and, even when coming under the same film category, might also be different corresponding to R, G and B. As a matter of course, the characteristic curve takes a different line in the reversal film from that in the negative film, however, it is the same that the characteristic curve differs depending on the film type and the three primary colors R, G and B.

The film characteristic storage unit 61 is stored with the data of the minimum density ($D_{min}$), the maximum density ($D_{max}$) and the density D with respect to the predetermined Log E as film characteristics in the form of a database, corresponding to each type of film. For example, there is exemplified a case where the film characteristic curve is stored as a function which will be shown as follows. The exemplification is not, however, restricted to this.

$$D = D_{min(i)} + (D_{max(i)} - D_{min(i)}) \times 1/(1 + e^{-Log\ E/a(i)}) (i = R, G, B)$$

Parameters [R] $D_{min(R)}$, $D_{max(R)}$, a(R)

[G] $D_{min(G)}$, $D_{max(G)}$, b(G)

[B] $D_{min(B)}$, $D_{max(B)}$, c(B)

A method of detecting the film type has no particular limitation, and, for instance, in the case of the Advanced Photo System film F as shown in the Figure, the magnetic head 42 of the scanner 30 reads the magnetic information of the film F on the magnetic recording medium S1. Thus, a film type is detected from the magnetic information and may be supplied to the film characteristic storage unit 61.

Further, the film type may also be detected by reading the DX code, etc. with the code reader 44 irrespective of the normal size film (135-size, etc.) or the Advanced Photo System film, and the operator may also input the film type by using the keyboard 18a, etc.

According to the apparatus in the illustrative example, the characteristics of the films of the various types are stored as a database in the film characteristic storage unit 61, and are read with a detection of the film type. The present invention is not, however, limited to this method.

For instance, in the case of the Advanced Photo System film F, the film characteristic may be magnetically recorded on the magnetic recording medium S1, read by the magnetic head 42 of the scanner 30, and supplied to the film characteristic storage unit 61. Further, regardless of the normal system film or the Advanced Photo System film, the film characteristic may be optically recorded through bar codes, etc. in an area other than the image (frame) region of the film, and read by the image sensor 34 as in the case of reading the image on the film by the code reader 44 of the scanner 30.

Moreover, the operator may also input the film characteristic by using the keyboard 18a, etc. On this occasion, the film characteristic is recorded on a main body of a one time use camera or on a film Patrone, etc., and the operator may input the film characteristic by visually recognizing it.

Furthermore, an examination of a contrivance that an IC memory be attached to the Advanced Photo System cartridge, is underway at present. The film type may be judged or the film characteristic may also be obtained by utilizing this contrivance.

Note that as in the example described above, according to a mode in which the film characteristic is stored in the form of the database in the film characteristic storage unit 61, it is preferable to facilitate adding, updating and rewriting the data on the film characteristic by inputting through the keyboard 18a, etc., reading from the recording medium such as a floppy disk, etc., and supplying the data through computer communications.

It is preferable that these pieces of data on the film characteristics be basically supplied from a film maker.

The lens characteristic data supply unit 63 serves to obtain the information for discriminating information on a camera loaded with the photographed film F and/or information on the photographic lens thereof, read out the lens characteristic of the photographic camera corresponding to the obtained discriminating information from a memory such as, e.g., a pre-created corresponding table, and supply the marginal light quantity compensating units 62A, 66A with the lens characteristic.

The lens characteristic data supply unit 63 includes the memory (corresponding table) previously stored with the pre-created corresponding table containing the informations on the camera and/or the photographic lens thereof and the characteristics of the photographic lens, i.e., stored with the information on the types of the various cameras and the lens characteristics of the photographic lenses, to be more specific, the data of a dipping quantity corresponding to distance from the image center in accordance with the lens of each type.

Figure 7A:
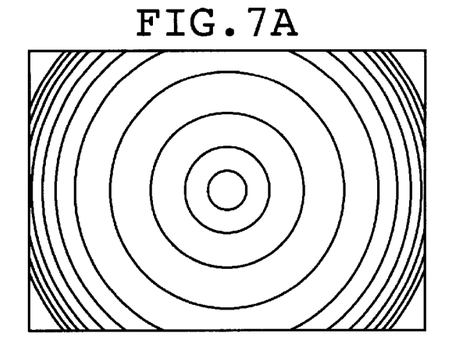
FIG. 7(A) is a diagram showing one example of a pattern representing a lens characteristic which can be developed into a mathematical formula.

If a change in the light quantity which occurs when the light source having a uniform light quantity (light intensity) over the entire surface beams on the image photographed on the photographic film through the above photographic lens, i.e., a decrease in the marginal light quantity or the dipping quantity, takes, for example, a concentric configuration as shown in FIG. 7(A), this might be developed into a mathematical formula of the distance from the image center, e.g., a polynomial such as a linear expression, a quadratic expression and a cubic expression. Therefore, the memory of the lens characteristic data supply unit 63 may be stored with the mathematical formula itself, or coefficients of respective terms and degrees of this mathematical formula as the characteristics of the photographic lens. When using, e.g., the cubic expression shown hereunder as the polynomial, the coefficients a, b, c, and d may be stored per photographic lens in the memory.

$$E = ar^3 + br^2 + cr + d$$

Where E is the dipping quantity, and r is the distance from the image center.

Figure 7B:
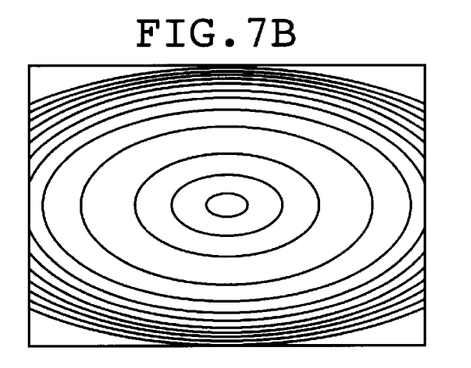
FIG. 7(B) is a diagram showing one example of a mask pattern representing a lens characteristic which is difficult of the development into the mathematical formula.

On the other hand, the change in the light quantity, i.e., the decrease in the marginal light quantity or the dipping quantity, assumes an elliptical shape as illustrated in FIG. 7(B), and besides this configuration varies with respect to the distance from the image center. In such a case, it is impossible or difficult to express the characteristic as a mathematical formula of the distance from the image center. Alternatively, if expressed as the mathematical formula, the formula becomes intricate, with the result that the process and calculation turns out to be complicated and require a large amount of time. Hence, as the characteristic of the photographic lens, e.g., a mask pattern of the entire surface of the image, or a portion thereof as the base if there is a symmetry, or, in the case of having, as shown in FIG. 7(B), for instance, two symmetric axes orthogonal to each other, the mask pattern one-fourth on the entire surface of the image may be stored in the memory of the lens characteristic data supply unit 63.

The lens characteristic data supply unit 63 reads, based on the discriminating information of the obtained camera and/or the photographic lens thereof, the information of the lens characteristic corresponding thereto, and supplies the marginal light quantity compensating units 62A, 66A with the lens characteristic information. Note that the lens characteristic is not limited to what is stored in the memory provided in the lens characteristic data supply unit 63. For example, the lens characteristic may be stored in the database connected to the printer 10 and read by having an access thereto, or may be inputted from outside as lens information corresponding to the film when in a reading process of the film F.

The marginal light quantity compensating units 62A, 66A compensate the decrease in the marginal light quantity by use of the characteristic of the photographic lens photographing the image on the film F, which is supplied from the lens characteristic data supply unit 63, the positional information of the image data (pixels) of the image, and a coordinate position from a center of the image (indicating where it is positioned from the central pixel). Note that this compensation of the marginal light quantity is explained later on.

Hereinafter, the operation of the processing apparatus 14, particularly of the marginal light quantity compensating unit 62A (66A) is described, thereby explaining the image processing apparatus of the present invention in greater details.

The operator loads into the scanner 12 the carrier 30 corresponding to the film F, i.e., the negative film F herein, sets the film F (cartridge) in a predetermined position of the carrier 30, inputs necessary indications such as a size, etc. of the print to be created, and thereafter gives an indication to start creating the print.

With this operation, a stop value of the variable stop 24 of the scanner 12 and an accumulation time of the image sensor (line CCD sensors) 34, are set corresponding to the reading condition of the pre-scan. Thereafter, the carrier 30 draws the film F out of the cartridge and carries the film F in the auxiliary scan direction at a speed corresponding to the pre-scan, thus starting the pre-scan. Then, as described above, the film F is slit-scanned in the predetermined reading position, and the projection light beam is projected to form an image at the image sensor 34. Then, the image photographed on the film F is separated into R, G and B and thus photoelectrically read.

Further, when carrying this film F, the magnetic information recorded on the magnetic recording medium S is read by the magnetic heads 42, and the bar codes such as DX codes are read by the code reader 44, thereby transmitting the required information to the predetermined units. In accordance with this embodiment, the film type and the lens information are detected from the magnetic information recorded on the magnetic recording medium S1, and supplied to the film characteristic storage unit 61 and the lens characteristic supply unit 63.

Note that according to the present invention, the pre-scan and the main scan may be executed framewise, or at an interval of all the frames or a predetermined number of frames, or alternatively executed consecutively. In the following discussion, a one-frame image reading process will be exemplified for simplifying the explanation.

The output signals of the image sensor 34 in the pre-scan are amplified by the amplifier 36, and transmitted to the A/D converter 38 and converted into the digital signals thereby.

The digital signals are transmitted to the processing apparatus 14, subjected to the predetermined data processing in the data processing unit 48, then converted by the Log converter 50 into pre-scan data defined as the digital image data, and stored in the pre-scan memory 52.

When the pre-scan data is stored in the pre-scan memory 52, the pre-scan-process-oriented marginal light quantity compensating unit 62A of the processing unit 62 reads the pre-scan data and compensates a marginal light quantity. Hereinafter, the compensation of the marginal light quantity will be explained with reference to a flowchart in FIG. 8.

Figure 8:
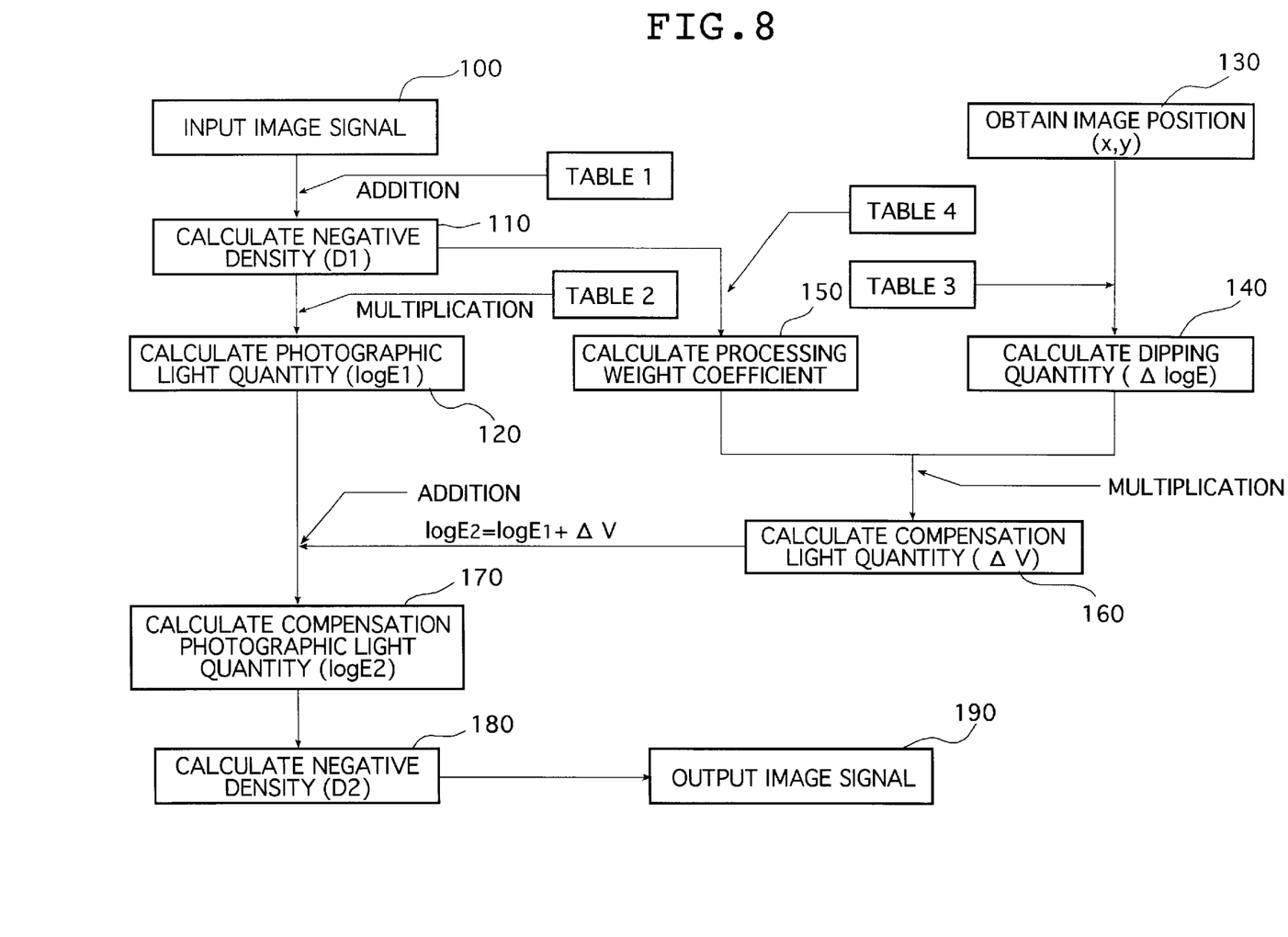
FIG. 8 is a flowchart showing one example of the marginal light quantity compensation in this embodiment.

To begin with, in step 100 in FIG. 8, the marginal light quantity compensating unit 62A reads the pre-scan data from the pre-scan memory 52, and, in step 110, calculates therefrom a negative density D1 for each of R, G and B referring to Table (e.g., a look-up table (LUT)) 1. Next, in step 120, referring to Table 2, the marginal light quantity compensating unit 62A calculates, as shown in FIG. 6, a photographic light quantity Log El by using the film characteristics (of which the three characteristic curves are, as described above, needed for R, G and B in the case of color) shown in FIG. 6 which are given from the film characteristic storage unit 61.

Figure 9:
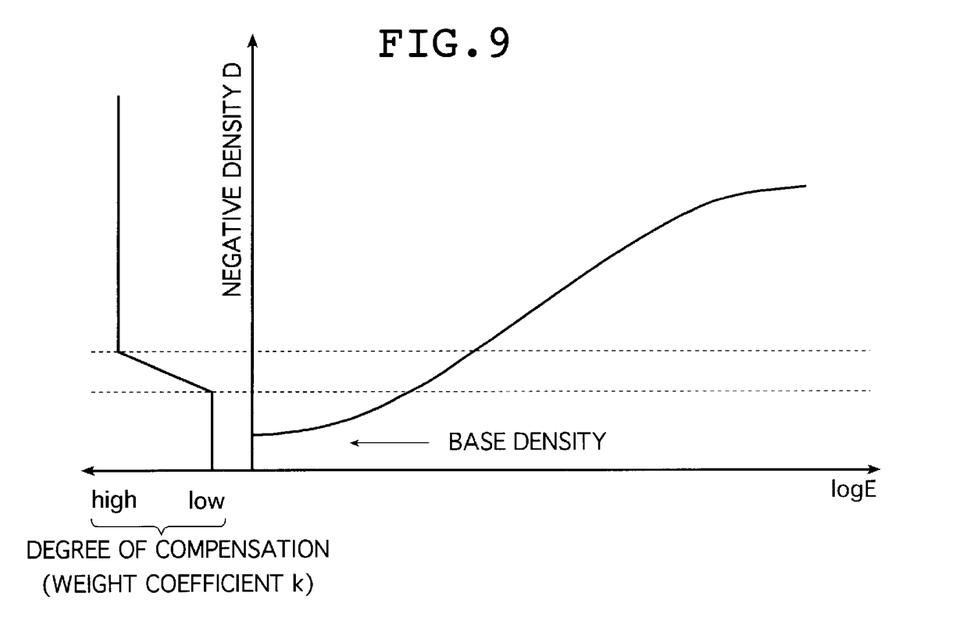
FIG. 9 is a graphic chart showing one example of a degree to which the marginal light quantity is compensated in this embodiment.

On the other hand, in step 130, the marginal light quantity compensating unit 62A obtains a position (x, y) of the image to be processed, and, in step 140, with reference to Table 3, calculates a dipping quantity $\Delta \log E$ indicating a decrease in the light quantity with respect to the pixel concerned by use of the lens characteristic given from the lens characteristic supply unit 63. Thus, the lens characteristic is developed into the dipping quantity with respect to the pixels over the entire surface of the pre-scan image. Next, in step 150, referring to Table 4, the marginal light quantity compensating unit 62A obtains a weight coefficient k indicating how much the light quantity is compensated with respect to this image. The marginal light quantity compensation is, as shown in FIG. 9, not implemented at all or so much by setting the weight coefficient k to "0" (or minimizing "k") or reducing the weight coefficient k (i.e., the degree of compensation is "low" in FIG. 9) in the vicinity of a base density (i.e.,the minimum density) implying the darkest area on the negative film, which is defined as an unexposed area. With respect to a range existing away from the base density (the minimum density), the weight coefficient k is set to "1" (or maximized) or increased, and the compensation is thus intensively or most intensively carried out (i.e., the degree of compensation is "high" in FIG. 9). As for an intermediate range, it is preferable that an intermediate compensation be executed. This is because it might happen that the picture becomes unnatural with an increased density in the vicinity of the base density if the intensive compensation is conducted in the vicinity of the base density.

Namely, according to the present invention, it is preferable that the intensity of the marginal light quantity compensation be changed corresponding to the negative density of the image. This makes it possible to decrease the compensation intensity (a decrease in the weight coefficient k) in the vicinity of the base density and to increase the compensation intensity as it gets farther away from the base density (an increase in the weight coefficient k), whereby it is feasible to finish the print exhibiting a naturally finished picture.

Next, in step 160, a compensation light quantity Δ V defined as a light quantity to be compensated, is calculated by multiplying the dipping quantity Δ log E by the weight coefficient k. In step 170, a compensation photographic light quantity Log E2 is obtained by adding the compensation light quantity Δ V to the photographic light quantity Log E1. Next, in step S180, this compensation light quantity Log E2 is again converted into a negative density D2 by utilizing the film characteristic shown in FIG. 6, and outputted as an image signal in step 190.

As discussed above, in accordance with this embodiment, the negative density is calculated from the image signal and then converted into the photographic light quantity by making use of the film characteristic curve. Then, the light quantity is compensated within a range of the photographic light quantity and again converted into the negative density.

Note that the dipping light quantity to be compensated is converted into a negative density in a range where the characteristic curve becomes approximately rectilinear, and this is added to the density, whereby the compensation can be also effected in the density region.

In the example discussed above, the image on the negative film is set as the object for the marginal light quantity compensation, and the intensity of the marginal light quantity compensation is changed corresponding to the negative density of the image. Then, the compensation intensity is decreased in the vicinity of the base density indicating the minimum density of the unexposed area, and the compensation intensity is increased as it gets farther away from the base density. The present invention is not, however, confined to this contrivance. For example, the image on the reversal film is set as an object for the light quantity compensation, wherein the compensation intensity may be decreased in the vicinity of the base density showing the maximum density of the unexposed area, and increased as it becomes farther away from the base density. Alternatively, the compensation intensity may be decreased in the vicinity of a fog density showing a maximum density which is defined as a fog range in the negative film or in the vicinity of the fog density indicating a minimum density which is defined as the fog range in the reversal film, and may be increased as it gets farther way from the maximum or minimum density (fog density).

Figure 10A:
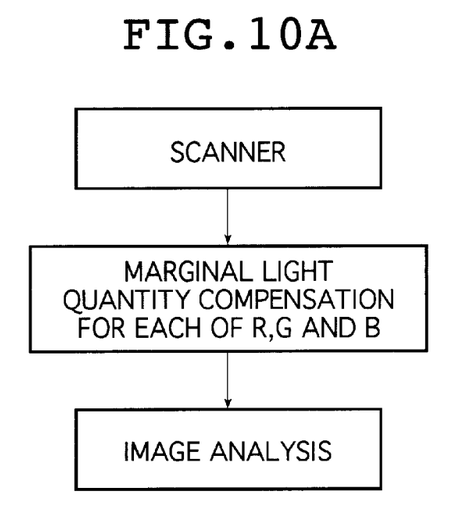
FIG. 10(A) is an explanatory diagram showing one example of a procedure of the marginal light quantity compensation in this embodiment.

The data, on which the marginal light quantity compensation has been executed, is transferred to the condition setting unit 60, wherein a condition for the image processing is set, and a variety of image analyzing processes are executed. This processing proceeds as shown in FIG. 10(A) The marginal light quantity compensation herein is conducted for each of R, G and B and may also be effected with respect to only the brightness.

The setup unit 72 of the condition setting unit 60 receives the post-correction data from the marginal light quantity compensating unit 62A, creates a density histogram, calculates an image characteristic quantity such as a highlight and a shadow, etc. Then, the setup unit 72 sets the main scan reading condition and supplies the scanner 12 with this reading condition. The setup unit 72 further sets image processing conditions in a variety of categories such as adjusting the gradation and a gray balance, and supplies these conditions to the parameter integrating unit 76.

The parameter integrating unit 76 having received the image processing conditions sets these conditions in predetermined units (hardware) of the pre-scan processing unit 56 and of the main scan processing unit 58.

The image, on which the marginal light quantity compensation has been done, is thereafter processed through the LUT and the MTX. Thereafter, the image is subjected to the necessary image processing such as a sharpness process and a dodging process in the block 62B. Subsequently, the image is converted into a simulation image by the image data converting unit 64 and displayed on the display unit 20.

The operator visually confirms or verifies the image, i.e., a result of the processing through the display on the display unit, and, as the necessity may arise, adjusts the color, the density, the gradation, and the like by using adjustment keys, etc. set on the keyboard 18a.

The main scan is carried out in the same way as the pre-scan with an exception that the reading condition such as the stop value of the variable stop 24, etc. becomes a set main scan reading condition. The output signals from the image sensor 34 are amplified by the amplifier 36, converted into the digital signals by the A/D converter 38, processed by the data processing unit 48 of the processing apparatus 14, then converted into the main scan data by the Log converter 50, and transmitted to the main scan memory 54.

Upon having sent the main scan data to the main scan memory 54, the main scan processing unit 58 reads out the main scan data, and the processing unit 66 executes the same image processing as the processing in the pre-scan processing unit 62 which has been explained above. Subsequently, the main scan data is converted by the image data converting unit 68 into the image data for output, and outputted to the printer 16.

Figure 10B:
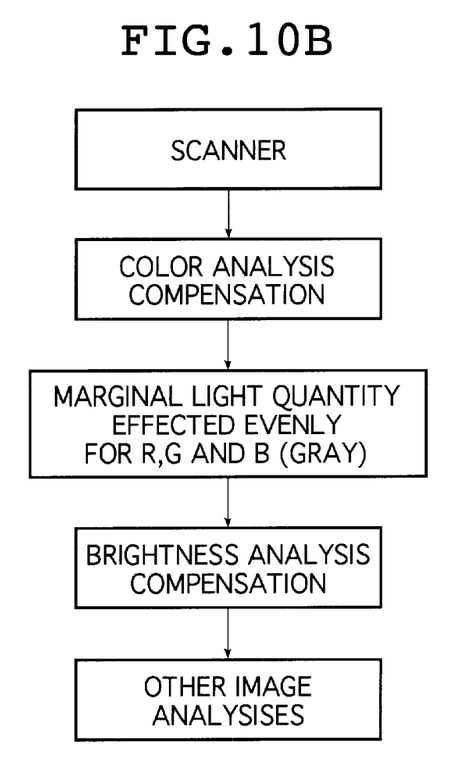
FIG. 10(B) is an explanatory diagram showing another example of the procedure of the marginal light quantity compensation.

In the example which has been explained so far, as shown in FIG. 10(A), the marginal light quantity is compensated for each of R, G and B before executing the image analyzing process such as the auto setup process, etc. As shown in FIG. 10(B), however, only the adjustment of the color balance (compensation of color analysis) may be made before compensating the marginal light quantity. More specifically, the color balance is adjusted (uniformized for R, G and B), and the marginal light quantity is compensated with a gray component. Thereafter, the gradation compensation of brightness (analysis compensation of brightness) is carried out, and subsequently other image analyzing processes such as the sharpness process and the dodging process, etc. are executed. With the processing thus done, a single characteristic curve may suffice.

The image processing apparatus of the present invention has been discussed so far in details. The present invention is not, however, limited to the embodiment discussed above and may be, as a matter of course, modified and changed in a variety of forms without deviating from the scope and the spirit of the present invention.

As explained above, according to the present invention, even in the case of the image photographed by using the one time use camera and an inexpensive compact camera, etc., it is feasible to stably output the naturally-finished image with a high quality without being darkened in the periphery of the image.

What is claimed is:

1. An image processing apparatus for executing predetermined image processing on image data obtained by photoelectrically reading an image photographed on a photographic film through a photographic lens of a camera, and thus obtaining the image data for output, comprising:

means for obtaining a characteristic of said photographic lens;

means for developing the characteristic of said photographic lens into a dipping quantity corresponding to a position of the image;

means for calculating a compensation light quantity by multiplying said dipping quantity by a predetermined compensation intensity indicating a degree to which a marginal light quantity is compensated; and means for compensating said marginal light quantity of the image by use of the thus calculated compensation light quantity.

2. An image processing apparatus according to claim 1, wherein said marginal light quantity compensating means changes an intensity of the marginal light quantity compensation corresponding to a film density of the image, in case of a negative film, decreases the compensation intensity in the vicinity of a minimum density in said negative film, and increases the compensation intensity as it gets farther away from the minimum density, or in case of a positive film, decreases the compensation intensity in the vicinity of a maximum density in said positive film and increases the compensation intensity as it gets farther away from the maximum density.

3. An image processing apparatus according to claim 1, further comprising:

means for obtaining information on the photographic film and means for converting the film density into a photographic light quantity and vice versa by use of a characteristic of the photographic film which is obtained from the information on the photographic film, wherein the marginal light quantity is compensated in a range of the photographic light quantity obtained by converting the film density calculated from said image data into said photographic light quantity with said converting means.

4. An image processing apparatus according to claim 1, wherein said marginal light quantity compensating means executes, when in a pre-scan process of reading the image with a low resolution in advance of an image reading process for creating the output image data, the marginal light quantity is compensated before an image analyzing the process containing an auto setup process, or after making only an adjustment of a color balance in the image analyzing process.

5. An image processing apparatus according to claim 1, further comprising:

means for obtaining information on said photographic lens, and a table previously created for showing a relationship between the information of the photographic lens and the characteristic of the photographic lens, wherein said photographic lens characteristic obtaining means reads a characteristic of said photographic lens corresponding to the obtained information of the photographic lens from the photographic lens information obtaining means and the table.

6. An image processing apparatus according to claim 1, wherein said marginal light quantity compensating means compensates a marginal light quantity of the image by use of a distance from a center of the image and the dipping quantity.

7. An image processing apparatus according to claim 1, wherein said means for developing the photographic lens characteristic into the dipping quantity is means for calculating a dipping quantity corresponding to the distance from the center of the image in accordance with the photographic lens characteristic.

8. An image processing apparatus according to claim 1, wherein said marginal light quantity compensating means does not compensate so much the marginal light quantity in the vicinity of the minimum density in a negative film or the maximum density in a positive film with respect to the image, intensively compensates the marginal light quantity in a density range existing away from the minimum density in the negative film or the maximum density in the positive film, and intermediately compensated the marginal light quantity in an intermediate density range therebetween in the negative film or the positive film.

9. A method of processing image data obtained by photoelectrically reading an image photographed on a film through a photographic lens of a camera, said method comprising the steps of:

obtaining a characteristic of a photographic lens;

developing the characteristic of said photographic lens into a dipping quantity corresponding to a position of said image;

calculating a compensation light quantity by multiplying said dipping quantity by a predetermined compensation intensity indicating a degree to which a marginal light quantity is compensated; and compensating the marginal light quantity of the image by use of the thus calculated compensation light quantity.

10. The method according to claim 9, wherein said step of compensating marginal light quantity changes an intensity of the marginal light quantity compensation corresponding to a film density of the image, in case of a negative film, decreases the compensation intensity in the vicinity of a minimum density in said negative film, and increases the compensation intensity as it gets farther away from the minimum density or in case of a positive film, decreases the compensation intensity in the vicinity of a maximum density in said positive film and increases the compensation intensity as it gets farther away from the maximum density.

11. The method according to claim 9, further comprising the steps of:

obtaining information on a characteristic of the photographic film; and converting a film density into a photographic light quantity based on said characteristic of the photographic film, wherein the marginal light quantity is compensated in a range of the photographic light quantity obtained by converting the film density calculated from said image data into said photographic light quantity with said converting step.

12. The method according to claim 9, wherein said step of compensating said marginal light quantity executes, when in a pre-scan process of reading the image with a low resolution in advance of an image reading process for creating the output image data, the marginal light quantity is compensated before an image analyzing the process containing an auto setup process, or after making only an adjustment of a color balance in the image analyzing process.

13. The method according to claim 9, further comprising the steps of:

obtaining information on said photographic lens; and creating a table for showing a relationship between the information of the photographic lens and the characteristic of the photographic lens.

14. The method according to claim 9, wherein said step of compensating said marginal light quantity compensates a marginal light quantity of the image by use of a distance from a center of the image and the dipping quantity.

15. The method according to claim 9, wherein said photographic lens characteristic is developed into the dipping quantity by calculating a dipping quantity corresponding to the distance from the center of the image in accordance with the photographic lens characteristic.

16. The method according to claim 9, wherein said step of compensating said marginal light quantity does not compensate so much the marginal light quantity in the vicinity of the minimum density in a negative film or the maximum density in a positive film with respect to the image, intensively compensates the marginal light quantity in a density range existing away from the minimum density in the negative film or the maximum density in the positive film, and intermediately compensates the marginal light quantity in an intermediate density range therebetween in the negative film or the positive film.

* * * * *